United States Patent
Chen et al.

(10) Patent No.: US 11,544,935 B2
(45) Date of Patent: Jan. 3, 2023

(54) SYSTEM FOR RISK OBJECT IDENTIFICATION VIA CAUSAL INFERENCE AND METHOD THEREOF

(71) Applicant: Honda Motor Co., Ltd., Tokyo (JP)

(72) Inventors: Yi-Ting Chen, Sunnyvale, CA (US); Chengxi Li, West Lafayette, IN (US)

(73) Assignee: HONDA MOTOR CO., LTD., Tokyo (JP)

(*) Notice: Subject to any disclaimer, the term of this patent is extended or adjusted under 35 U.S.C. 154(b) by 23 days.

(21) Appl. No.: 16/916,428

(22) Filed: Jun. 30, 2020

(65) Prior Publication Data

US 2021/0264167 A1  Aug. 26, 2021

Related U.S. Application Data

(60) Provisional application No. 62/981,785, filed on Feb. 26, 2020.

(51) Int. Cl.
*G06V 20/00* (2022.01)
*G06V 20/56* (2022.01)
(Continued)

(52) U.S. Cl.
CPC ............... *G06V 20/56* (2022.01); *G06T 7/75* (2017.01); *G06V 10/751* (2022.01);
(Continued)

(58) Field of Classification Search
CPC .. G06K 9/00791; G06K 9/6202; G06K 9/008; G06T 7/75; G06T 2210/12;
(Continued)

(56) References Cited

U.S. PATENT DOCUMENTS

| 11,205,082 B2 | 12/2021 | Adeli-Mosabbeb et al. |
| 2018/0118264 A1 | 5/2018 | Adiprasito et al. |

(Continued)

FOREIGN PATENT DOCUMENTS

| EP | 2654028 | 10/2013 |
| JP | 2019-207464 | 12/2019 |

OTHER PUBLICATIONS

Kim et al, Interpretable learning for self-driving cars by visualizing causal attention, arXiv:1703.10631v1 (Year: 2017).*

(Continued)

*Primary Examiner* — Nancy Bitar
*Assistant Examiner* — Xiao Liu
(74) *Attorney, Agent, or Firm* — Rankin, Hill & Clark LLP

(57) ABSTRACT

A system and method for risk object identification via causal inference that includes receiving at least one image of a driving scene of an ego vehicle and analyzing the at least one image to detect and track dynamic objects within the driving scene of the ego vehicle. The system and method also include implementing a mask to remove each of the dynamic objects captured within the at least one image. The system and method further include analyzing a level of change associated with a driving behavior with respect to a removal of each of the dynamic objects. At least one dynamic object is identified as a risk object that has a highest level of influence with respect to the driving behavior.

20 Claims, 5 Drawing Sheets

(51) Int. Cl.
   *G06T 7/73* (2017.01)
   *G06V 10/75* (2022.01)
(52) U.S. Cl.
   CPC ............... *G06T 2207/10024* (2013.01); *G06T 2207/20081* (2013.01); *G06T 2207/20084* (2013.01); *G06T 2207/30252* (2013.01); *G06T 2210/12* (2013.01)
(58) Field of Classification Search
   CPC . G06T 2207/10024; G06T 2207/20084; G06T 2207/20081; G06T 2207/30252
   See application file for complete search history.

(56) References Cited

U.S. PATENT DOCUMENTS

| | | | | |
|---|---|---|---|---|
| 2018/0253622 | A1* | 9/2018 | Chen | G06N 3/08 |
| 2021/0171061 | A1* | 6/2021 | Etesami | B60W 30/0956 |

OTHER PUBLICATIONS

Wang et al, Deep object-centric policies for autonomous driving, ICRA, Montreal, Canada, May 20-24, pp. 8853-8859 (Year: 2019).*
He et al, Mask R-CNN, 2017 ICCV, pp. 2961-2969 (Year: 2017).*
Dai et al, Instance-aware Semantic Segmentation via Multi-task Network Cascades, 2016 CVPR, pp. 3150-3158 (Year: 2016).*
Yurtsever et al, Risky Action Recognition in Lane Change Video Clips using Deep Spatiotemporal Networks with Segmentation Mask Transfer, arXiv:1906.02859v2 (Year: 2020).*
A. Narayanan, A. Siravuru, and B. Dariush, "Temporal multi-modal fusion for driver behavior prediction tasks using gated recurrent fusion units," arXiv preprint arXiv: 1910.00628, 2019.
https://pytorch.org/.
https://github.com/pascalxia/driver_attention_prediction.
S. Alletto, A. Palazzi, F. Solera, S. Calderara, and R. Cucchiara. DR(eye)VE: A Dataset for Attention-based Tasks with Applications to Autonomous and Assisted Driving. In CVPRW, 2016.
M. Bojarski, D. D. Testa, D. Dworakowski, B. Firner, B. Flepp, P. Goyal, L. D. Jackel, M. Monfort, U. Muller, J. Zhang, X. Zhang, J. Zhao, and K. Zieba. End to End Learning for Self-Driving Cars. In arXiv preprint arXiv:1604.07316, 2016.
F. Codevilla, M. Müller, A. López, V. Koltun, and A. Dosovitskiy. End-to-end Driving via Conditional Imitation Learning. In ICRA, 2018.
F. Codevilla, E. Santana, A. López, and A. Gaidon. Exploring the Limitations of Behavior Cloning for Autonomous Driving. In arXiv preprint arXiv:1904.08980, 2019.
P. de Haan, D. Jayaraman, and S. Levine. Causal Confusion in Imitation Learning. In NeurIPS, 2019.
M. Gao, A. Tawari, and S. Martin. Goal-oriented Object Importance Estimation in On-road Driving Videos. In ICRA, 2019.
R. Girshick, I. Radosavovic, G. Gkioxari, P. Dollár, and K. He. Detectron. https://github.com/facebookresearch/detectron, 2018.
J. Hawke, R. Shen, C. Gurau, S. Sharma, D. Reda, N. Nikolov, P. Mazur, S. Micklethwaite, N. Griffiths, A. Shah, and A. Kendall. Urban Driving with Conditional Imitation Learning. In arXiv preprint arXiv:1912.00177, 2019.
K. He, G. Gkioxari, P. Dollar, and R. Girshickn. Mask R-CNN. In CVPR, 2017.
S. Hochreiter and J. Schmidhuber. Long Short-term Memory. Neural computation, 1997.
T. Jayram, T. Kornuta, V. Albouy, E. Sevgen, and A. Ozcan. Learning Multi-Step Spatio-Temporal Reasoning with Selective Attention Memory Network In NeurIPS, 2019.
N. R. Ke, O. Bilaniuk, A. Goyal, S. Bauer, H. Larochelle, C. Pal, and Y. Bengio. Learning Neural Causal Models from Unknown Interventions. In arXiv preprint arXiv:1910.01075, 2019.
J. Kim and J. Canny. Interpretable Learning for Self-driving Cars by Visualizing Causal Attention. In ICCV, 2017.
J. Kim, T. Misu, Y.-T. Chen, A. Tawari, and J. Canny. Grounding human-to-vehicle advice for self-driving vehicles. In CVPR, 2019.
S. Lefèvre, D. Vasquez, and C. Laugier. A survey on motion prediction and risk assessment for intelligent vehicles. ROBOMECH Journal, 1:1, 2014.
C. Li, Y. Meng, S. H. Chan, and Y.-T. Chen. Learning 3D-aware Egocentric Spatial-Temporal Interaction via Graph Convolutional Networks. In ICRA, 2020.
T.-Y. Lin, M. Maire, S. Belongie, J. Hays, P. Perona, D. Ramanan, P. Dollár, and C. L. Zitnick. Microsoft COCO: Common Objects in Context. In ECCV, 2014.
G. Liu, a. K. J. S. Fitsum A. Reda, T.-C. Wang, A. Tao, and B. Catanzaro. Image Inpainting for Irregular Holes using Partial Convolutions. In ECCV, 2018.
G. Liu, K. J. Shih, T.-C. Wang, F. A. Reda, K. Sapra, Z. Yu, A. Tao, and B. Catanzaro. Partial Convolution based Padding. arXiv preprint arXiv:1811.11718, 2018.
S. Nair, Y. Zhu, S. Savarese, and L. Fei-Fei. Causal Induction from Visual Observations for Goal Directed Tasks. In NeurIPS 2019 Workshop on Causal Machine Learning, 2019.
A. Rahimpour, S. Martin, A. Tawari, and H. Qi. Context Aware Road-user Importance Estimation (iCARE). In IV, 2019.
V. Ramanishka, Y.-T. Chen, T. Misu, and K. Saenko. Toward Driving Scene Understanding: A Dataset for Learning Driver Behavior and Causal Reasoning. In CVPR, 2018.
O. Russakovsky, J. Deng, H. Su, J. Krause, S. Satheesh, S. Ma, Z. Huang, A. Karpathy, A. Khosla, M. Bernstein, A. C. Berg, and L. Fei-Fei. ImageNet LargeScale Visual Recognition Challenge. In IJCV, 2015.
N. Srivastava, G. Hinton, A. Krizhevsky, I. Sutskever, and R. Salakhut-dinov. Dropout: A Simple Way to Prevent Neural Networks from Overfitting. JMLR, 2014.
C. Szegedy, S. Ioffe, V. Vanhoucke, and A. A. Alem. Inception-v4, Inception-ResNet and the Impact of Residual Connections on Learning. In AAAI, 2017.
A. Tawari, P. Mallela, and S. Martin. Learning to Attend to Salient Targets in Driving Videos using Fully Convolutional RNN. In ITSC, 2018.
D. Wang, C. Devin, Q.-Z. Cai, P. Krähenbühl, and T. Darrell. Monocular plan view networks for autonomous driving. In IROS, 2019.
D. Wang, C. Devin, Q.-Z. Cai, F. Yu, and T. Darrell. Deep Object Centric Policies for Autonomous Driving. In ICRA, 2019.
N. Wojke, A. Bewley, and D. Paulus. Simple Online and Realtime Tracking with a Deep Association Metric. In ICIP, 2017.
Y. Xia, D. Zhang, J. Kim, and D. W. Ken Nakayama, Karl Zipser. Predicting Driver Attention in Critical Situations. In ACCV, 2018.
H. Xu, Y. Gao, F. Yu, and T. Darrell. End-to-end Learning of Driving Models from Large-scale Video Datasets. In CVPR, 2017.
M. Xu, M. Gao, Y.-T. Chen, L. Davis, and D. Crandall. Temporal Recurrent Networks for Online Action Detection. In ICCV, 2019.
F. Yu, W. Xian, Y. Chen, F. Liu, M. Liao, V. Madhavan, and T. Darrell. BDD100K: A Diverse Driving Video Database with Scalable Annotation Tooling. In arXiv preprint arXiv:1805.04687, 2018.
K.-H. Zeng, S.-H. Chou, F.-H. Chan, J. C. Niebles, and M. Sun. Agent-Centric Risk Assessment: Accident Anticipation and Risky Region Localization. In CVPR, 2017.
Z. Zhang, C. Yu, and D. Crandall. A Self Validation Network for Object-Level Human Attention Estimation. In NeurIPS, 2019.
J. L. Ba, J. R. Kiros, and G. E. Hinton, "Layer Normalization," in arXiv preprint arXiv:1607.06450, 2016.
J. Carreira and A. Zisserman, "Quo Vadis, Action Recognition? A New Model and the Kinetics Dataset," in IEEE Conference on Computer Vision and Pattern Recognition, 2017.
C. Chen, A. Seff, A. Kornhauser, and J. Xiao, "DeepDriving: Learning Affordance for Direct Perception in Autonomous Driving," in IEEE International Conference on Computer Vision, 2015.
M. Cordts, M. Omran, S. Ramos, T. Rehfeld, M. Enzweiler, R. Benenson, U. Franke, S. Roth, and B. Schiele, "The Cityscapes Dataset for Semantic Urban Scene Understanding," in IEEE Conference on Computer Vision and Pattern Recognition, 2016.

(56) References Cited

OTHER PUBLICATIONS

R. De Geest, E. Gavves, A. Ghodrati, Z. Li, C. Snoek, and T. Tuytelaars, "Online action detection," in IEEE European Conference on Computer Vision, 2016.
A. Doshi and M. Trivedi, "Tactical Driver Behavior Prediction and Intent Inference: A Review," in International IEEE Conference on Intelligent Transportation Systems, 2011.
A. Geiger, P. Lenz, and R. Urtasun, "Are We Ready for Autonomous Driving? The KITTI Vision Benchmark Suite," in IEEE Conference on Computer Vision and Pattern Recognition, 2012.
A. Jain, H. S. Koppula, B. Raghavan, S. Soh, and A. Saxena, "Car that Knows Before You Do: Anticipating Maneuvers via Learning Temporal Driving Models," in IEEE International Conference on Computer Vision, 2015.
D. Jayaraman and K. Grauman, "Learning Image Representations Tied to Egomotion from Unlabeled Video," International Journal of Computer Vision, vol. 125, No. 1, pp. 136-161, 2017. [Online]. Available: https://doi.org/10.1007/s11263-017-1001-2.
W. Kay, J. Carreira, K. Simonyan, B. Zhang, C. Hillier, S. Vijayanarasimhan, F. Viola, T. Green, T. Back, P. Natsev, M. Suleyman, and A. Zisserman, "The Kinetics Human Action Video Dataset," in arXiv preprint arXiv:1705.06950, 2017.
D. P. Kingma and J. Ba, "Adam: A Method for Stochastic Optimization," in arXiv preprint arXiv:1412.6980, 2014.
T. N. Kipf and M. Welling, "Semi-supervised Classification with Graph Convolutional Networks," in IEEE International Conference on Learning Representations, 2017.
K. Lasinger, R. Ranftl, K. Schindler, and V. Koltun, "Towards Robust Monocular Depth Estimation: Mixing Datasets for Zero-Shot Cross-Dataset Transfer," in arXiv preprint arXiv:1907.01341, 2019.
S. Lefèvre, C. Laugier, and J. Ibañez-Guzmán, "Intention-aware risk estimation for general traffic situations, and application to intersection safety," 2013.
W. Maddem, G. Pascoe, C. Linegar, and P. Newman, "1 Year, 1000km: The Oxford RobotCar Dataset," The International Journal of Robotics Research, vol. 36, No. 1, pp. 3-15, 2017.
V. Madhavan and T. Darrell, "The BDD-Nexar Collective: A Large-Scale, Crowsourced, Dataset of Driving Scenes," Master's thesis, EECS Department, University of California, Berkeley, May 2017. [Online]. Available: http://www2.eecs.berkeley.edu/Pubs/TechRpts/2017/EECS-2017-113.html.
J. A. Michon, "A Critical View of Driver Behavior Models: What Do We Know, What Should We Do?" Human Behavior and Traffic Safety, pp. 485-520, 1985.
T. Misu and Y.-T. Chen, "Toward Reasoning of Driving Behavior," in International IEEE Conference on Intelligent Transportation Systems, 2019.
A. Narayanan, Y.-T. Chen, and S. Malla, "Semi-supervised Learning: Fusion of Self-supervised, Supervised Learning, and Multimodal Cues for Tactical Driver Behavior Detection," in IEEE Conference on Computer Vision and Pattern Recognition Workshop, 2018.
N. Oliver and A. Pentland, "Graphical Models for Driver Behavior Recognition in a SmartCar," in IEEE Intelligent Vehicles Symposium, 2000.
A. Rahimpour, S. Martin, A. Tawari, and H. Qi, "Context aware road-user importance estimation (icare)," in IEEE Intelligent Vehicles Symposium, 2019.
J. Redmon, S. Divvala, R. Girshick, and A. Farhadi, "You Only Look Once:Unified, Real-Time Object Detection," in IEEE Conference on Computer Vision and Pattern Recognition, 2016.
S. Ren, K. He, R. Girshick, and J. Sun, "Faster R-CNN: Towards Real-Time Object Detection with Region Proposal Networks," in IEEE Conference on Neural Information Processing Systems, 2015.
E. Santana and G. Hotz, "Learning a Driving Simulator," CoRR, vol. abs/1608.01230, 2016.
C. Szegedy, V. Vanhoucke, S. Ioffe, J. Shlens, and Z. Wojna, "Rethinking the Inception Architecture for Computer Vision," in IEEE Conference on Computer Vision and Pattern Recognition, 2016.
X. Wang and A. Gupta, "Videos as Space-Time Region Graphs," in IEEE European Conference on Computer Vision, 2018.
J. Wu, L. Wang, L. Wang, J. Guo, and G. Wu, "Learning Actor Relation Graphs for Group Activity Recognition," in IEEE Conference on Computer Vision and Pattern Recognition, 2019.
S. Yan, Y. Xiong, and D. Lin, "Spatial Temporal Graph Convolutional Networks for Skeleton-Based Action Recognition," in Conference on Artificial Intelligence, 2018.
H. Zhao, J. Shi, X. Qi, X. Wang, and J. Jia, "Pyramid Scene Parsing Network," in IEEE Conference on Computer Vision and Pattern Recognition, 2017.
Yoneda et al., Convulutional neural network based vehicle turn signal recognition, 2017 International Conference on Intelligent Informatics and Biomedical Sciences (ICIIBMS), pp. 204-205 (Year: 2017).
Office Action of U.S. Appl. No. 17/005,833 dated Jan. 27, 2022, 39 pages.
Office Action of U.S. Appl. No. 17/005,833 dated Apr. 11, 2022, 34 pages.
R. Izquierdo et al. "Experimental validation of lane-change intention prediction methodologies based on CNN and LSTM." 2019 IEEE Intelligent Transportation Systems Conference (ITSC), IEEE 2019, Oct. 30, 2019. https://ieeexplore.ieee.org/document/8917331.
Patrick Gebert et al. "End-to-end Prediction of Driver Intention using 3D Convolutional Neural Networks," 2019 IEEE Intelligent Vehicles Symposium (IV), IEEE Jun. 12, 2019. https://ieeexplore.ieee.org/document /8814249.
Notice of Allowance of U.S. Appl. No. 17/005,833 dated Jun. 1, 2022, 8 pages.

\* cited by examiner

US 11,544,935 B2

SYSTEM FOR RISK OBJECT IDENTIFICATION VIA CAUSAL INFERENCE AND METHOD THEREOF

CROSS-REFERENCE TO RELATED APPLICATION

This application claims priority to U.S. Provisional Application Ser. No. 62/981,785 filed on Feb. 26, 2020, which is expressly incorporated herein by reference.

BACKGROUND

Risk object identification may be an essential step towards driver centric risk assessment. Human drivers may have the capability to identify risk objects and assess their risk in order to drive safely. For instance, while turning left at an intersection, drivers may be able to efficiently attend to relevant objects (e.g., oncoming vehicles or crossing pedestrians) and assess their risk for decision making.

In intelligent automated driving systems, it may be crucial to enable systems with such ability. To achieve the ultimate goal, existing works for risk object identification includes labeling risk objects in a noisy and time consuming fashion by receiving numerous inputs while utilizing high amounts of processing power and provide no explicit reasoning for identifying risk objects.

BRIEF DESCRIPTION

According to one aspect, a computer-implemented method for risk object identification via causal inference that includes receiving at least one image of a driving scene of an ego vehicle and implementing a mask to remove each of the dynamic objects captured within the at least one image. The computer-implemented method also includes implementing a mask to remove each of the dynamic objects captured within the at least one image. The computer-implemented method further includes analyzing a level of change associated with a driving behavior with respect to a removal of each of the dynamic objects. At least one dynamic object is identified as a risk object that has a highest level of influence with respect to the driving behavior.

According to another aspect, a system for risk object identification via causal inference that includes a memory storing instructions when executed by a processor cause the processor to receive at least one image of a driving scene of an ego vehicle and analyze the at least one image to detect and track dynamic objects within the driving scene of the ego vehicle. The instructions also cause the processor to implement a mask to remove each of the dynamic objects captured within the at least one image. The instructions further cause the processor to analyze a level of change associated with a driving behavior with respect to a removal of each of the dynamic objects. At least one dynamic object is identified as a risk object that has a highest level of influence with respect to the driving behavior.

According to yet another aspect, a non-transitory computer readable storage medium storing instructions that when executed by a computer, which includes a processor perform a method that includes receiving at least one image of a driving scene of an ego vehicle and implementing a mask to remove each of the dynamic objects captured within the at least one image. The method also includes implementing a mask to remove each of the dynamic objects captured within the at least one image. The method further includes analyzing a level of change associated with a driving behavior with respect to a removal of each of the dynamic objects. At least one dynamic object is identified as a risk object that has a highest level of influence with respect to the driving behavior.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
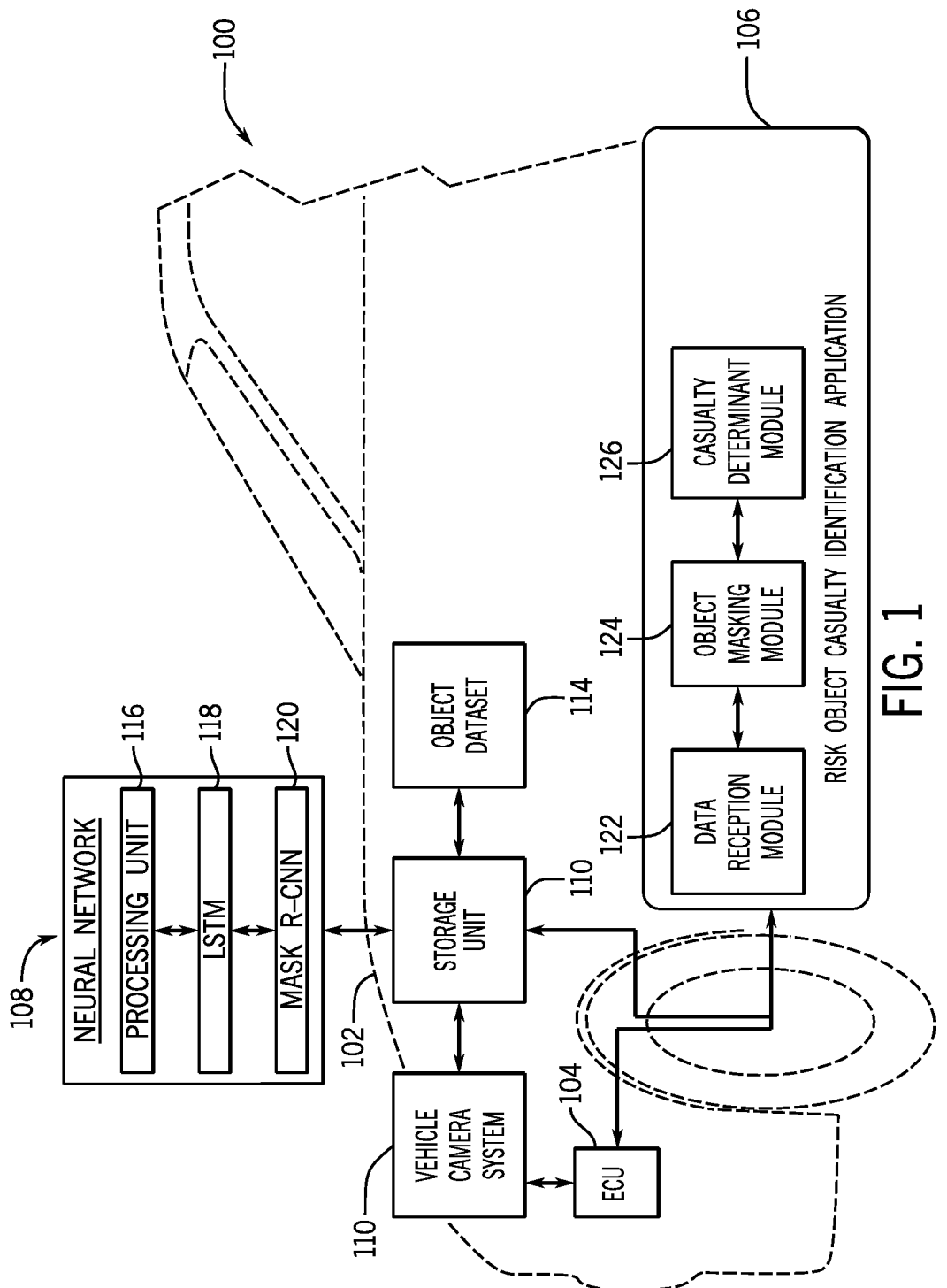
FIG. 1 is a schematic view of an exemplary system for risk object identification via causal inference according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action (s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines.

Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for risk object identification via causal inference according to an exemplary embodiment of the present disclosure. The components of the system 100, as well as the components of other systems, hardware architectures, and software architectures discussed herein, may be combined, omitted, or organized into different architectures for various embodiments.

Generally the system 100 may include an ego vehicle 102. The ego vehicle 102 may include, but may not be limited to, an automobile, a robot, a forklift, a bicycle/motor bike, a wheel chair/scooter, and the like that may be traveling within one or more types of environments. For purposes of simplicity, this disclosure will describe the embodiments of the system 100 with respect to an ego vehicle 102 as a passenger vehicle (e.g., car). The ego vehicle 102 includes an electronic control unit (ECU) 104 that executes one or more applications, operating systems, ego vehicle system and subsystem user interfaces, among others. The ECU 104 may also execute a risk object causality identification application (causality identification application) 106 that may be configured to provide risk object identification via causal inference.

As discussed in more detail below, the causality identification application 106 may be configured to receive images of a surrounding environment of the ego vehicle 102 as the ego vehicle 102 is traveling within one or more types of environments. The causality identification application 106 may be configured to analyze driving scene of the ego vehicle 102 from the images. The driving scene may include a predetermined vicinity of the ego vehicle 102 as the ego vehicle 102 is being operated. The causality identification application 106 may be configured to analyze the images of the driving scene of the ego vehicle 102 to detect one or more driving behaviors that may include, but may not be limited to, stopping, continuing to go/accelerating, driving straight, turning right, turning left, merging right, merging left, and the like. The causality identification application 106 may also be configured to analyze the images of the driving scene of the ego vehicle 102 to detect and track one or more dynamic objects that may be located within the driving scene of the ego vehicle 102. The one or more dynamic objects may include traffic participants that are traveling on one or more roadways that are included within the driving scene of the ego vehicle 102. In particular, the one or more dynamic objects may include, but may not be limited to, additional vehicles, pedestrians, bicyclists, and the like that are traveling within the driving scene of the ego vehicle 102. The surrounding dynamic objects may be located in front of the ego vehicle 102, crossing a path of the ego vehicle 102, adjacent to the ego vehicle 102, merging in a current lane of the ego vehicle 102, behind the ego vehicle 102, and the like.

Upon detecting and tracking each of the dynamic objects, the causality identification application 106 may be configured to implement a mask to electronically remove each of the dynamic objects captured within the images. As discussed below, the mask may be implemented using a neural network 108 to iteratively stimulate a causal effect by electronically removing each dynamic object as included within the images of the driving scene of the ego vehicle 102. By doing so, the application 106 may be configured to quantify a causal effect with respect to one or more driving behaviors that may pertain to each of the dynamic objects within the driving scene. Accordingly, the independent removal of each of the dynamic objects captured within the driving scene of the ego vehicle 102 may be utilized to evaluate the causal effect of the respective removed dynamic object on a particular driving behavior that may be exhibited based on the presence of the respective dynamic object within the driving scene of the ego vehicle 102.

By electronically removing each of the dynamic objects in an independent manner, the causality identification application 106 may evaluate a level of change that may be associated with a driving behavior if the respective dynamic object was not included within the driving scene of the ego vehicle 102. The level of change may pertain to an amount that the driving behavior would change if not for the presence of the respective dynamic object causing a particular driving behavior. Stated differently, given an image, the application 106 intervenes by removing each dynamic object individually from the rest of the driving scene. Accordingly, the application 106 may be configured to predict a corresponding action in the absence of that particular dynamic object which iteratively simulates a casual effect based on the removal of that dynamic object.

Accordingly, the causality identification application 106 identifies a level of causal connection between each of the dynamic objects located within the driving scene of the ego vehicle 102 and a particular driving behavior exhibited with respect to the operation of the ego vehicle 102. The causality identification application 106 may be configured to analyze the level of change associated with the driving behavior with respect to the removal of each of the dynamic objects to thereby assign a causality score that is associated with each dynamic object. The causality score may be associated with the causal relationship between the presence of each dynamic object and the particular driving behavior (e.g., stopping the ego vehicle 102) based on the level of change associated with the electronical removal of each of the static objects (e.g., if not for the presence of the particular driving object, the ego vehicle 102 would not have stopped and would keep accelerating).

In one embodiment, the causality score may be included as part of a range (e.g., 1-10) that may be associated with a level of causal relationship. Accordingly, each of the dynamic objects within the driving scene may be assigned a respective causality score upon their independent electronic removal and analysis of an impact in a level of change in the driving behavior. Accordingly, dynamic objects that may most impact the driving behavior may be assigned a higher causality score than peripheral dynamic objects that may be located within the driving scene of the ego vehicle 102 since the dynamic objects with the most impact cause a driver of the ego vehicle 102 to implement a particular driving behavior (e.g., such as stopping the ego vehicle 102).

In one configuration, the causality identification application 106 may further determine one or more of the dynamic objects located within the driving scene of the ego vehicle 102 that are assigned the highest causality score with respect to the other dynamic objects within the driving scene. The causality identification application 106 may further classify the particular dynamic object(s) as a risk object. In other words, the causality identification application 106 may classify one or more dynamic objects that cause the most substantial causal effect with respect to the driving behavior as a risk object that may be associated with a highest level of impact with respect to a particular driving behavior. The functionality of the causality identification application 106 requires minimal annotations since the application 106 simply requires tactical behavior labels (e.g., go, stop, straight, left turn, right turn, etc.) at an image frame level. Accordingly, there is no requirement to classify and label important object locations in every image captured image frame of the driving scene.

With reference to FIGS. 2A-2D, illustrative examples of the functionality of causality identification application 106, the causality identification application 106 may be configured to receive an image 200 of the driving scene of the ego vehicle 102. As shown, in FIG. 2A and an overhead view of the driving scene in FIG. 2B, the driving scene may include dynamic objects 202-208 that are configured as additional vehicles that are located ahead of the ego vehicle 102 and adjacent to the ego vehicle 102. Based on a driving behavior of stopping the ego vehicle 102, the ego vehicle 102 is operated to stop behind the dynamic object 202.

In an exemplary embodiment, upon receiving the image 200, the causality identification application 106 may be configured to detect and track each of the dynamic objects 202-208. The application 106 may be configured to apply a mask out each of the dynamic objects 202-208 independently to electronically remove them from the image 200 and thereby inpaint the image 200. Accordingly, the image 200 may be analyzed as a driving scene that does not independently include one of the dynamic objects 202-208 while still including the other dynamic objects.

Figure 2A:
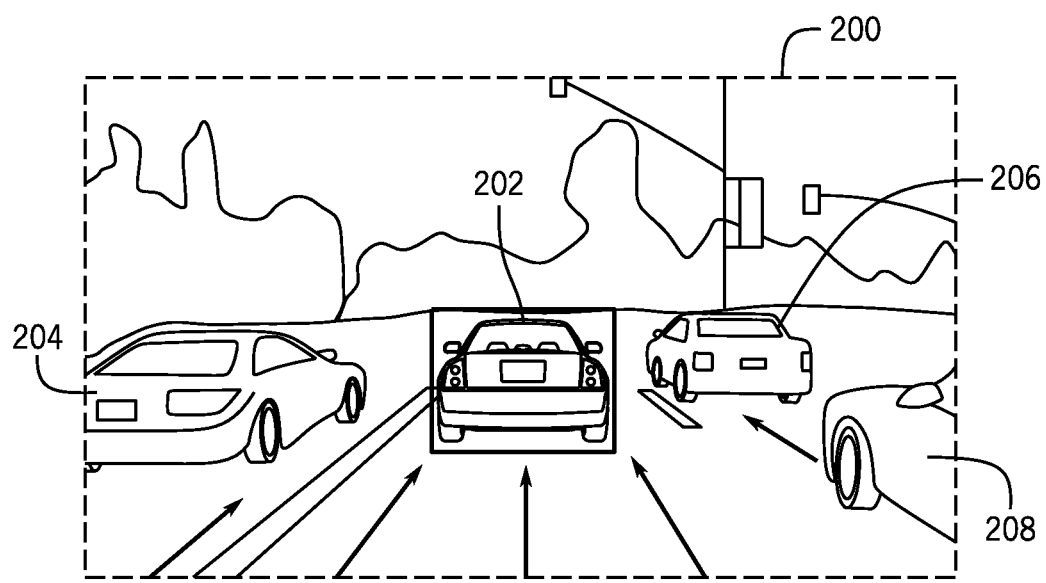
FIG. 2A is an ego centric view of a driving scene that includes dynamic objects according to an exemplary embodiment of the present disclosure.
Figure 2B:
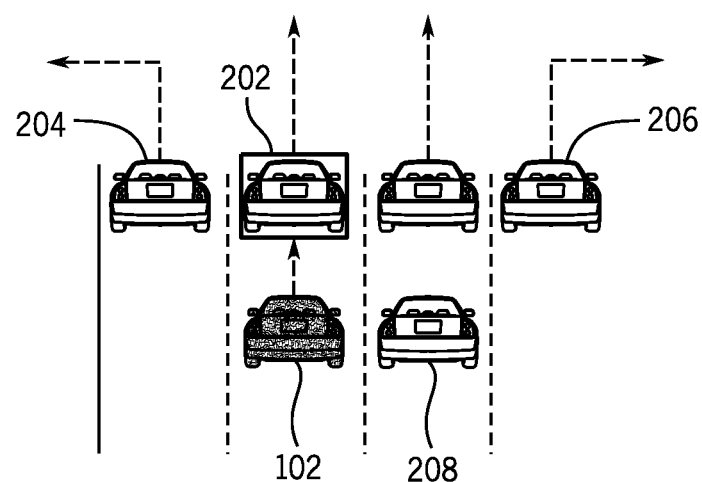
FIG. 2B is an overhead view of the driving scene that includes the dynamic objects according to an exemplary embodiment of the present disclosure.
Figure 2C:
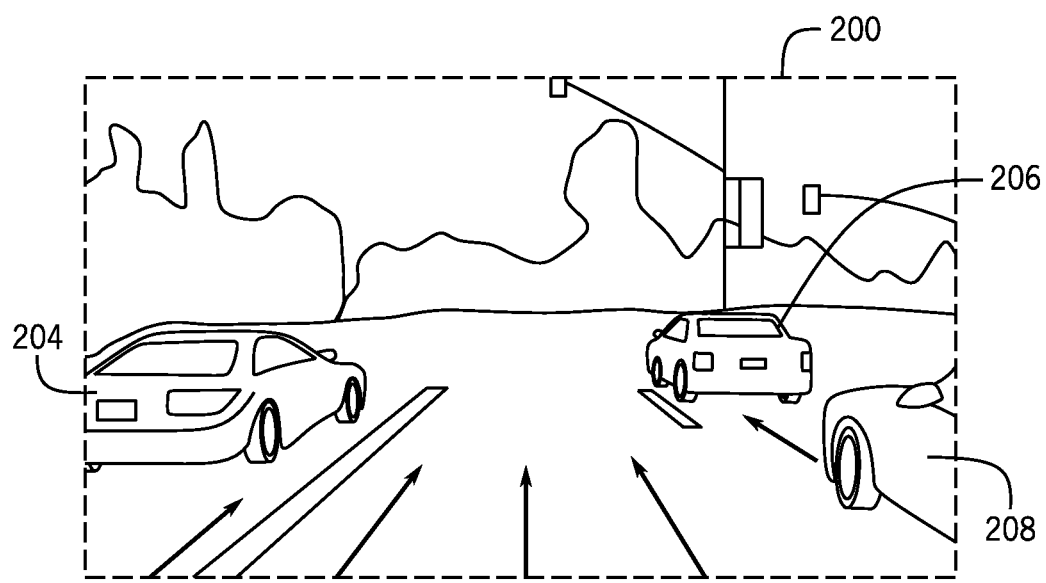
FIG. 2C is an ego centric view of a driving scene that includes at least one dynamic object electronically removed from the driving scene according to an exemplary embodiment of the present disclosure.

As shown in FIG. 2C, for example, the dynamic object 202 is masked to be removed from the driving scene while the other dynamic objects 204-208 remain within the driving scene. The application 106 is thereby configured to complete this masking for each of the respective dynamic objects 202-208 and evaluate the driving scene to determine a level of change of the driving behavior or stopping based on the removal of each of the respective dynamic objects 202. Accordingly, the causality identification application 106 may analyze the driving scene without each of the dynamic objects 202-208 independently and may determine a level of change with respect to the stopping driving behavior.

As shown in FIGS. 2A and 2B, the dynamic objects 204-208 are located in periphery of the ego vehicle 102 and the application 106 may thereby determine that their removal from the driving scene may not result in a high level of change with respect to the driving behavior of stopping the ego vehicle 102. In other words, the application 106 may determine that if the dynamic objects 204-208 were not included within the driving scene, the driving behavior of stopping the ego vehicle 102 may not highly change, since the dynamic object 202 is stopped ahead of the ego vehicle 102.

Figure 2D:
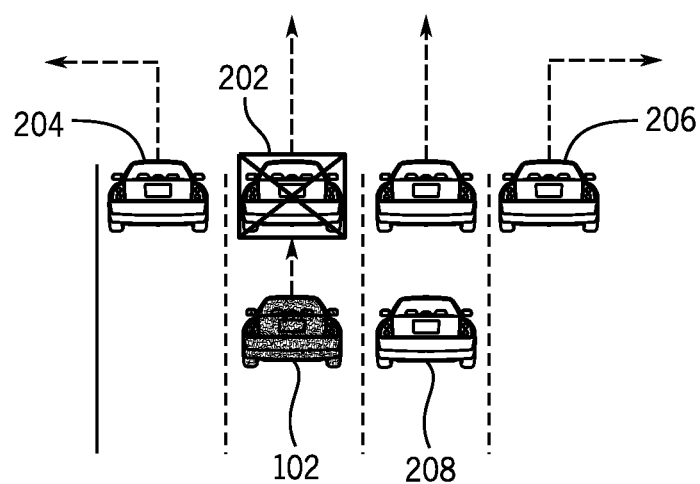
FIG. 2D is an overhead view of the driving scene that includes the at least one dynamic object electronically removed from the driving scene according to an exemplary embodiment of the present disclosure.

On the other hand, as shown in FIGS. 2C and 2D, the causality identification application 106 may determine a high level of change with respect to the stopping driving behavior of the ego vehicle 102 based on the electronic removal of the dynamic object 202 since a path of the ego vehicle 102 is no longer blocked. Accordingly, the causality identification application 106 may assign a highest causality score with respect to the dynamic object 202 and may assign lower causality scores with respect to each of the dynamic objects 204-208 based on the level of change that is associated with a change in the driving behavior of stopping to not stopping/accelerating based on their respective presence within the driving scene. The causality identification application 106 may further classify the particular dynamic object 202 as a risk object that may cause the most substantial causal effect with respect to the driving behavior of stopping the ego vehicle 102.

With reference again to FIG. 1, in addition to the ECU 104, the ego vehicle 102 may also include a plurality of components, including a vehicle camera system 110 and a storage unit 112. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102. The ECU 104 may also include a communication device (not shown) for sending data internally within (e.g., between one or more components) the ego vehicle 102 and communicating with externally hosted computing systems (e.g., external to the ego vehicle 102).

The vehicle camera system 110 may include one or more of the cameras (not shown) that may be positioned in one or more directions and at one or more areas to capture one or more images of the surrounding environment of the ego vehicle 102 (e.g., images of the roadway on which the ego vehicle 102 is traveling). The one or more cameras of the vehicle camera system 110 may be disposed at external front portions of the ego vehicle 102, including, but not limited to different portions of the ego vehicle dashboard, ego vehicle bumper, ego vehicle front lighting units, ego vehicle fenders, and the windshield. In one embodiment, the one or more cameras may be configured as RGB cameras that may capture RGB video/images. The one or more cameras may be configured to capture rich information about object appearance, as well as interactions between the ego vehicle 102 and the dynamic objects within the surrounding environment of the ego vehicle 102.

In other embodiments, the one or more cameras may be configured as stereoscopic cameras that are configured to capture environmental information in the form three-dimensional images. In one or more configurations, the one or more cameras may be configured to capture the driving scene of the ego vehicle 102 as RGB images/videos. The vehicle camera system 110 may be configured to convert one or more RGB images/videos (e.g., sequences of images) into image data that is communicated to the causality to be analyzed.

Generally, the ECU 104 may communicate with the storage unit 112 to execute the one or more applications, operating systems, ego vehicle system and subsystem user interfaces, and the like that are stored within the storage unit 112. In one embodiment, the storage unit 112 may store an object dataset 114. The object dataset 114 may be configured as an electronic dataset that may pertain to various types of driving scenes (e.g., two-lane highway, three-lane highway, intersection, on/off ramp, roadway circles), various positions of dynamic objects within the various types of driving scenes, causality scores associated with the various dynamic objects in the various types of driving scenes, and if applicable designations of the various dynamic objects as risk objects. As discussed, upon determining the causality score associated with each of the dynamic objects located within the driving scene of the ego vehicle 102 and classifying the risk object for each driving scene, the causality identification application 106 may be configured to access the object dataset 114 and populate the object dataset 114 with a description of the type of driving scene, various positions of dynamic objects within the various types of driving scenes, causality scores associated with the various dynamic objects in the various types of driving scenes, and if applicable designations of the various dynamic objects as risk objects.

In some embodiments, the causality identification application 106 may be configured to access the object dataset 114 to retrieve the stored data to efficiently assign risk scores to similarly positioned dynamic objects in similar types of driving scenes as stored upon the object dataset 114. Accordingly, the object dataset 114 may be configured as a model that is associated with various nodes to assign risk scores to various dynamic objects located in various driving scenes at one or more future points in time. Accordingly, once the causality identification application 106 executes an iterative process to analyze the level of change associated with a driving behavior with respect to the removal of each of the dynamic objects, assigning the casualty score that is associated with the causal relationship with the driving behavior based on the level of change, and assigning one or more dynamic objects as risk objects, the application 106 may store respective data upon the object dataset 114. At one or more future points in time, the causality identification application 106 may thereby assign risk scores to similarly positioned dynamic objects in similar types of driving scenes as stored upon the object dataset 114 without executing the interactive process.

In some embodiments, the causality identification application 106 may be configured provide an input that may be utilized to control an autonomous/semi-autonomous operation of the ego vehicle 102 by sending one or more commands to the ECU 104 to control one or more vehicle systems and/or control units (not shown) of the ego vehicle 102 to perform one or more driving behaviors based on causality scores associated with the various dynamic objects in the various types of driving scenes and designations of the various dynamic objects as risk objects.

In an exemplary embodiment, the storage unit 112 may be configured to additionally store the neural network 108. The neural network 108 may be configured as a convolutional neural network (CNN) that is configured to analyze image frames provided by the vehicle camera system 110. In one embodiment, the neural network 108 may be controlled by a processing unit 116. The processing unit 116 may be configured to provide processing capabilities to be configured to utilize machine learning/deep learning to be utilized to analyze inputted data in the form of image data and may utilize a mask R-CNN 120 and a long short-term memory module (LSTM) 118 to provide artificial intelligence capabilities. As discussed below, the mask R-CNN 120 may be configured to detect and track every dynamic object included within each driving scene throughout time. The LSTM 118 may be configured to update ego vehicle features and object features at a time t.

In one configuration, the causality identification application 106 may be configured to utilize the neural network 108 to execute a sequence of binary masks and object tracklets upon each driving scene extracted from image frames associated with image data provided by the vehicle camera system 110. The neural network 108 may be configured to complete partial convolution and average pooling to obtain ego features associated with the ego vehicle 102. The neural network 108 may execute Region of Interest pooling Align (ROI Align) by computing bounding boxes around each of the portions of each image frame that includes the dynamic objects. The neural network 108 may thereby may divide a region of interest of the image frame associated with each of the dynamic objects into equal sizes boxes to apply bilinear interpolation with respect to them to determine dynamic object features. The neural network 108 may also be configured to model each feature temporally and may propagate information to form a visual representation of each driving scene to execute the iterative process to analyze the level of change associated with a driving behavior with respect to the removal of each of the dynamic objects that are individually masked out using the convolution mask and removed from the tracklets. Accordingly, the functionality of the neural network 108 enables the causality identification application 106 to assign the casualty score that is associated with the causal relationship with the driving behavior based on the level of change and further classify one or more dynamic objects as risk objects.

II. The Risk Object Causality Identification Application and Related Methods

Components of the causality identification application 106 will now be described according to an exemplary embodiment and with reference to FIG. 1. In an exemplary embodiment, the causality identification application 106 may be stored on the storage unit 112 and executed by the ECU 104 of the ego vehicle 102. In another embodiment, the causality identification application 106 may be stored on an externally hosted computing infrastructure and may be accessed by a telematics control unit (not shown) of the ego vehicle 102 to be executed by the ECU 104 of the ego vehicle 102.

The general functionality of causality identification application 106 will now be discussed. In an exemplary embodiment, the causality identification application 106 may include a plurality of modules 122-126 that may be configured for risk object identification via causal inference. The plurality of modules 122-126 may include a data reception module 122, an object masking module 124, and a causality determinant module 126. However, it is appreciated that the causality identification application 106 may include one or more additional modules and/or sub-modules that are included in lieu of the modules 122-126.

Figure 3:
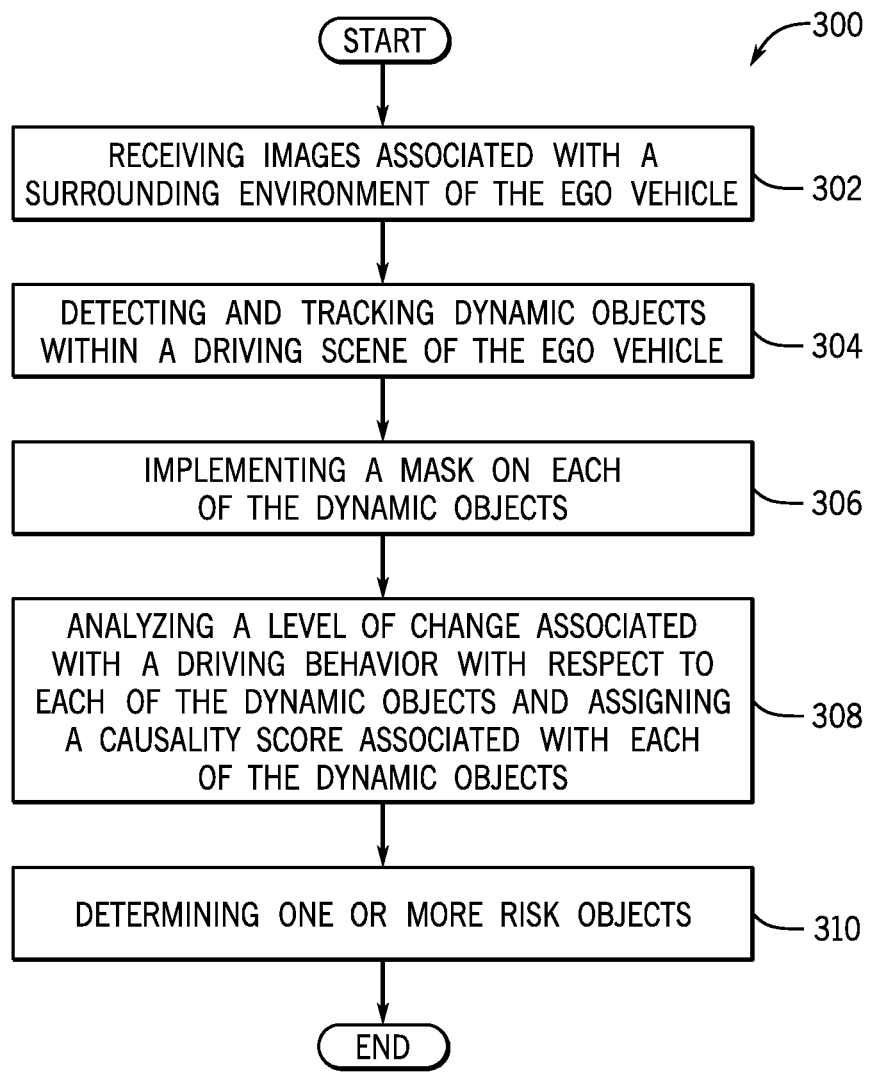
FIG. 3 is a process flow diagram of a method of the iterative process of analyzing the level of change associated with a driving behavior with respect to the removal of each of the dynamic objects and classifying one or more dynamic objects as risk objects according to an exemplary embodiment of the present disclosure.

FIG. 3 is a process flow diagram of a method 300 of the iterative process of analyzing the level of change associated with a driving behavior with respect to the removal of each of the dynamic objects and classifying one or more dynamic objects as risk objects according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving images associated with a surrounding environment of the ego vehicle 102.

In an exemplary embodiment, the data reception module 122 of the causality identification application 106 may be configured to receive image data that may be associated with images captured of the surrounding environment of the ego vehicle 102 that may be provided by the vehicle camera system 110 of the ego vehicle 102. As discussed above, the image data may pertain to one or more RGB images/video of the dynamic objects that are located within the surrounding environment of the ego vehicle 102 that are captured by one or more cameras that are operably connected to the vehicle camera system 110. In some embodiments, the data reception module 122 may package and store the image data on the storage unit 112 to be evaluated at one or more points in time.

The method 300 may proceed to block 304, wherein the method 300 may include detecting and tracking dynamic objects within a driving scene of the ego vehicle 102. In one embodiment, the data reception module 122 may be configured to evaluate the image data and may extract image frames from the image data that include the driving scene of the ego vehicle 102. In one embodiment, the data reception module 122 may be configured to evaluate a particular image frame captured at time t, a plurality of image frames captured before the time t (e.g., t−1, t−2, t−n) and a plurality of image frames captured after the present time t (e.g., t+1, t+2, t+n) to detect one or more driving behaviors of the ego vehicle 102 that may include, but may not be limited to, stopping, continuing to go/accelerating, driving straight, turning right, turning left, merging right, merging left, and the like. The data reception module 122 may additionally be configured to utilize the neural network 108 to detect and track the one more dynamic objects that may be located within the driving scene of the ego vehicle 102 captured within the image frame at the time t.

In particular, the data reception module 122 may be configured to utilize the neural network 108 to compute a respective bounding box around each of the dynamic objects included within the image frame. In other words, the neural network 108 may be configured to compute bounding boxes around each of the dynamic objects located within the driving scene. In one configuration, the Mask R-CNN 120 and Deep SORT (not shown) may be applied to detect and track every dynamic object throughout time. As discussed above, ROIAlign may be employed to extract dynamic object representations. At time t, the ego vehicle features and dynamic object features are updated via the LSTM 118. Accordingly, this temporal modeling process executed by the neural network 108 captures the dynamics of the ego vehicle 102 and the dynamic objects located within the driving scene and the neural network 108 may output detection and tracking data to the data reception module 122.

With continued reference to FIG. 3, the method 300 may proceed to block 306, wherein the method 300 may include implementing a mask on each of the dynamic objects. In an exemplary embodiment, upon receiving detection and tracking data from the neural network 108, the data reception module 122 may be configured to communicate respective data to the object masking module 124 of the causality identification application 106. The object masking module 124 may be configured to utilize the neural network 108 to execute machine learning/deep learning processing to provide a one-channel binary mask on subsets of pixels of the image frame that are encapsulated within each of the bounding boxes that include each of the dynamic objects located within the driving scene.

In an exemplary embodiment, the neural network 108 may complete image inpainting to electronically remove and replace each of pixels associated with each of the dynamic objects independently, such that each dynamic object is singularly removed and its removal is analyzed to output a level of driving behavior change with respect to the particular removed dynamic object. In particular, the image inpainting executed by the neural network 108 is based on a masked and re-normalized convolution operation that enables a hallucination in the masked area because convolutional results depend only on the non-masked regions at every layer. The operation thereby enables removing each dynamic object independently for intervention.

In one embodiment, the pixel value of a mask is set to be 1 by default. The pixel values of the dynamic objects to be removed from the driving scene are set to be 0. To obtain object level representation, the neural network 108 is configured to aggregate the ego vehicle features and object features that are updated by the LSTM 118 (as discussed above) via message passing.

$$g = h_e \oplus \frac{1}{N}\left(\sum_{i=1}^{N} h_i\right) \quad (1)$$

where $g$ is defined as the aggregated features, $h_e$ represents the ego's features obtained after temporal modeling and $h_o = \{h_1, h_2, \ldots, h_N\}$ are the N object features, $\oplus$ indicates a concatenation operation.

In one configuration, to manipulate the representation at an object level, the neural network 108 sets the value to be 0 at the location of the electronically removed dynamic object. The mask influences the features extracted from partial convolution and disconnects the message of the selected object from the rest. In the end, this representation g is passed through fully connected layers to obtain the final classification of the driver behavior.

The method 300 may proceed to block 308, wherein the method 300 may include analyzing a level of change associated with a driving behavior with respect to each of the dynamic objects and assigning a causality score associated with each of the dynamic objects. In an exemplary embodiment, upon removing each dynamic object included within the driving scene, the object masking module 124 may be configured to communicate data pertaining to the removal of the particular dynamic object to the causality determinant module 126 of the causality identification application 106.

In one embodiment, the causality determinant module 126 may be configured to pass the driving scene without each removed dynamic object through the neural network 108 to be analyzed via a trained driving model. The neural network 108 may thereby output a predicted causality score of two alternative driving behaviors (e.g., stop/go) and may analyze the driving scene to determine a level of change pertaining to the two driving behaviors with the presence of the dynamic object and without the presence of dynamic object as it's electronically removed from the driving scene included in the image frame. In other words, the causality determinant module 126 may analyze a level of change associated with a driving behavior with respect to the removal of each of the dynamic objects and may thereby assign a causality score that is associated with a causal relationship with the driving behavior based on the level of change.

In particular, the neural network 108 may enable the causality determinant module 126 to determine a level of causal connection between each of the dynamic objects located within the driving scene of the ego vehicle 102 and a particular driving behavior exhibited with respect to the operation of the ego vehicle 102. The causality determinant module 126 may be configured to analyze the level of change associated with the driving behavior with respect to the removal of each of the dynamic objects to thereby assign the causality score that is associated with each dynamic object. The causality score may be associated with the causal relationship between the presence of each dynamic object and the particular driving behavior (e.g., stop vs. go) based on the level of change associated with the electronical removal of each of the static objects (e.g., if not for the presence of the particular driving object, the ego vehicle 102 would not stop and would go).

As discussed, the causality score may be included as part of a range that may be associated with a level of causal relationship. Accordingly, each of the dynamic objects within the driving scene may be assigned a respective causality score upon their independent electronic removal and analysis of an impact in a level of change in the driving behavior. The neural network 108 may be configured to assign the dynamic objects that have a higher level of impact the driving behavior with a higher causality score than peripheral dynamic objects that may be located within the driving scene of the ego vehicle 102.

With continued reference to FIG. 3, the method 300 may proceed to block 310, wherein the method 300 may include determining one or more risk objects. In an exemplary embodiment, upon assigning a causality score associated with each of the dynamic objects included within the driving scene, the causality determinant module 126 may be configured to determine one or more of the dynamic objects located within the driving scene of the ego vehicle 102 that are assigned the highest causality score. The causality determinant module 126 may further classify the one or more respective objects that are assigned the highest causality score as risk objects. In other words, the causality determinant module 126 may classify one or more dynamic objects that cause the most substantial causal effect with respect to the driving behavior as a risk object.

Figure 4:
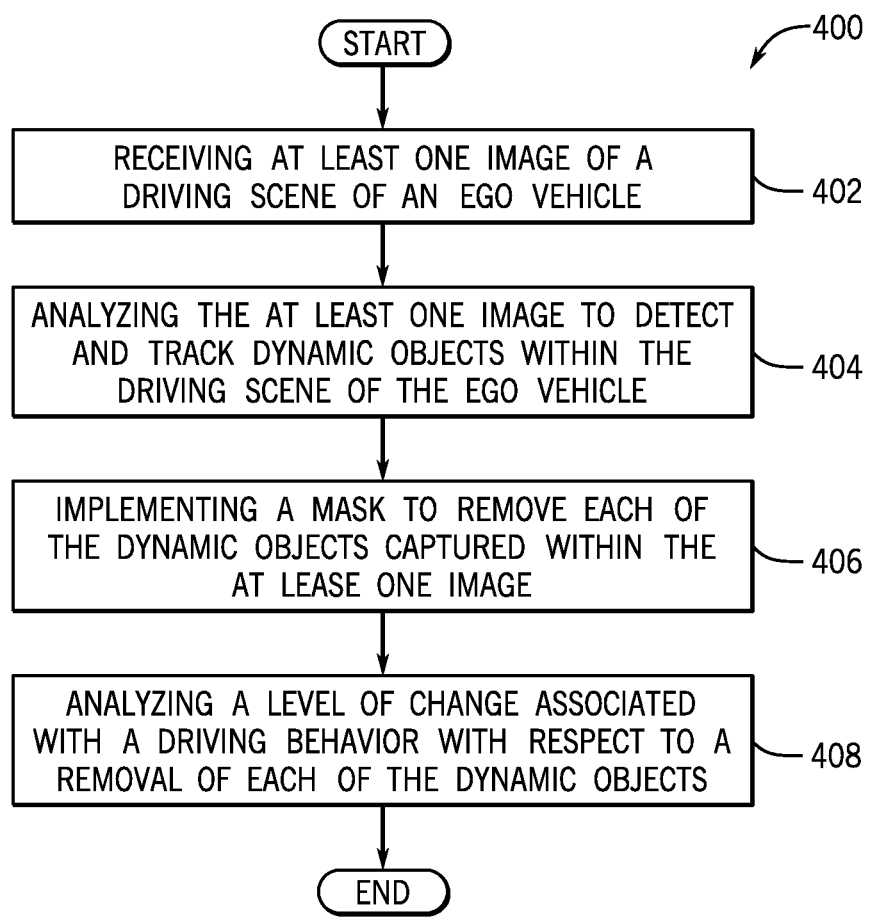
FIG. 4 is a process flow diagram of a method for risk object identification via causal inference according to an exemplary embodiment of the present disclosure.

FIG. 4 is a process flow diagram of a method 400 for risk object identification via causal inference according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include receiving at least one image of a driving scene of an ego vehicle 102.

The method 400 may proceed to block 404, wherein the method 400 may include analyzing the at least one image to detect and track dynamic objects within the driving scene of the ego vehicle 102. The method 400 may proceed to block 406, wherein the method 400 may include implementing a mask to remove each of the dynamic objects captured within the at least one image. The method 400 may proceed to block 408, wherein the method 400 may include analyzing a level of change associated with a driving behavior with respect to the removal of each of the dynamic objects. In one embodiment, at least one dynamic object is identified as a risk object that has a highest level of influence with respect to the driving behavior.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for risk object identification via causal inference comprising:
   receiving at least one image of a driving scene of an ego vehicle;
   analyzing the at least one image to detect and track dynamic objects within the driving scene of the ego vehicle;
   implementing a mask to remove each of the dynamic objects captured within the at least one image by computing a bounding box upon pixels of the at least one image that include each of the dynamic objects within the driving scene and using image inpainting to remove each of the dynamic objects encapsulated within each bounding box; and
   analyzing a level of change associated with a driving behavior with respect to a removal of each of the dynamic objects captured within the at least one image based on the implemented mask, wherein at least one dynamic object is identified as a risk object that has a highest level of influence with respect to the driving behavior.

2. The computer-implemented method of claim 1, wherein receiving the at least one image includes receiving a Red Green Blue (RGB) image of a surrounding environment of the ego vehicle and extracting image frames that include the driving scene of the ego vehicle that include the dynamic objects, wherein the dynamic objects include traffic participants that are located within the driving scene.

3. The computer-implemented method of claim 1, wherein analyzing the at least one image includes computing the bounding box around each dynamic object included within an image frame and executing a temporal modeling process executed by a neural network to detect and track the ego vehicle and the dynamic objects.

4. The computer-implemented method of claim 3, wherein implementing the mask to remove each of the dynamic objects includes executing machine learning processing to provide a one-channel binary mask on subsets of pixels of the image frame that are encapsulated within the bounding box that includes each dynamic object located within the driving scene.

5. The computer-implemented method of claim 4, wherein the neural network completes the image inpainting to electronically remove and replace each of pixels associated with each of the dynamic objects independently, wherein the image inpainting executed by the neural network is based on a masked and re-normalized convolution operation that enables a hallucination in a masked area.

6. The computer-implemented method of claim 1, wherein the mask influences features extracted from partial convolution and disconnects a message of the removed dynamic object from a rest of the driving scene.

7. The computer-implemented method of claim 1, wherein analyzing the level of change includes determining the level of change pertaining to two driving behaviors with a presence of the dynamic object and without the presence of dynamic object as the dynamic object is removed from the driving scene.

8. The computer-implemented method of claim 7, wherein each of the dynamic objects are assigned a causality score that is associated with a causal relationship with the driving behavior based on the level of change.

9. The computer-implemented method of claim 8, wherein the at least one dynamic object is identified as the risk object based on determining that the at least one dynamic object is assigned a highest causality score in comparison to additional dynamic objects included within the driving scene.

10. A system for risk object identification via causal inference comprising:
    a memory storing instructions when executed by a processor cause the processor to:
    receive at least one image of a driving scene of an ego vehicle;
    analyze the at least one image to detect and track dynamic objects within the driving scene of the ego vehicle;
    implement a mask to remove each of the dynamic objects captured within the at least one image by computing a bounding box upon pixels of the at least one image that include each of the dynamic objects within the driving scene and using image inpainting to remove each of the dynamic objects encapsulated within each bounding box; and
    analyze a level of change associated with a driving behavior with respect to a removal of each of the dynamic objects captured within the at least one image based on the implemented mask, wherein at least one dynamic object is identified as a risk object that has a highest level of influence with respect to the driving behavior.

11. The system of claim 10, wherein receiving the at least one image includes receiving a Red Green Blue (RGB) image of a surrounding environment of the ego vehicle and extracting image frames that include the driving scene of the ego vehicle that include the dynamic objects, wherein the dynamic objects include traffic participants that are located within the driving scene.

12. The system of claim 10, wherein analyzing the at least one image includes computing the bounding box around each dynamic object included within an image frame and executing a temporal modeling process executed by a neural network to detect and track the ego vehicle and the dynamic objects.

13. The system of claim 12, wherein implementing the mask to remove each of the dynamic objects includes executing machine learning processing to provide a one-channel binary mask on subsets of pixels of the image frame that are encapsulated within the bounding box that includes each dynamic object located within the driving scene.

14. The system of claim 13, wherein the neural network completes the image inpainting to electronically remove and replace each of pixels associated with each of the dynamic objects independently, wherein the image inpainting executed by the neural network is based on a masked and re-normalized convolution operation that enables a hallucination in a masked area.

15. The system of claim 10, wherein the mask influences features extracted from partial convolution and disconnects a message of the removed dynamic object from a rest of the driving scene.

16. The system of claim 10, wherein analyzing the level of change includes determining the level of change pertaining to two driving behaviors with a presence of the dynamic object and without the presence of dynamic object as the dynamic object is removed from the driving scene.

17. The system of claim 16, wherein each of the dynamic objects are assigned a causality score that is associated with a causal relationship with the driving behavior based on the level of change.

18. The system of claim 17, wherein the at least one dynamic object is identified as the risk object based on determining that the at least one dynamic object is assigned a highest causality score in comparison to additional dynamic objects included within the driving scene.

19. A non-transitory computer readable storage medium storing instructions that when executed by a computer, which includes a processor perform a method, the method comprising:
  receiving at least one image of a driving scene of an ego vehicle;
  analyzing the at least one image to detect and track dynamic objects within the driving scene of the ego vehicle;
  implementing a mask to remove each of the dynamic objects captured within the at least one image by computing a bounding box upon pixels of the at least one image that include each of the dynamic objects within the driving scene and using image inpainting to remove each of the dynamic objects encapsulated within each bounding box; and
  analyzing a level of change associated with a driving behavior with respect to a removal of each of the dynamic objects captured within the at least one image based on the implemented mask, wherein at least one dynamic object is identified as a risk object that has a highest level of influence with respect to the driving behavior.

20. The non-transitory computer readable storage medium of claim 19, wherein the at least one dynamic object is identified as the risk object based on determining that the at least one dynamic object is assigned a highest causality score that is associated with a causal relationship with the driving behavior based on the level of change in comparison to additional dynamic objects included within the driving scene.

* * * * *